Dec. 11, 1956 F. A. SMALLEY 2,773,713
ANGLERS KNOT TYING VISE
Filed Nov. 28, 1955
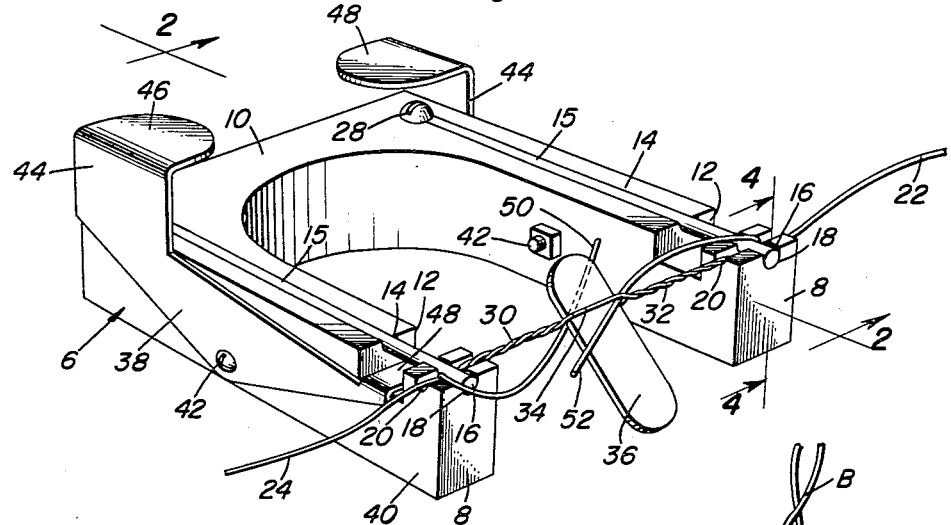
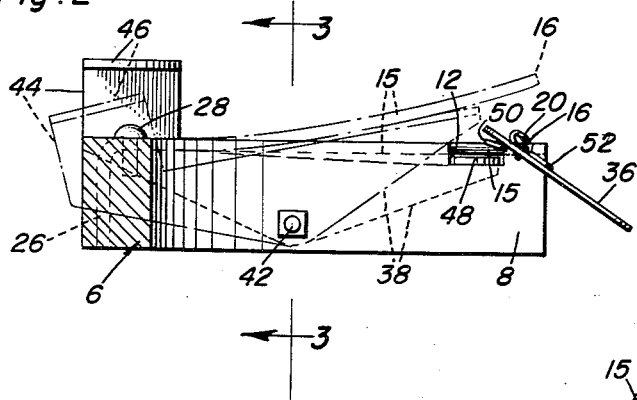
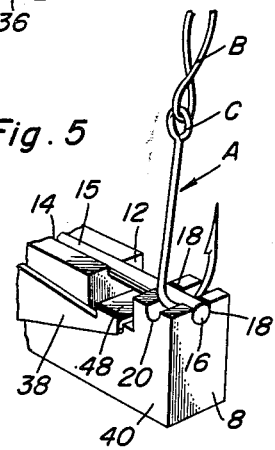
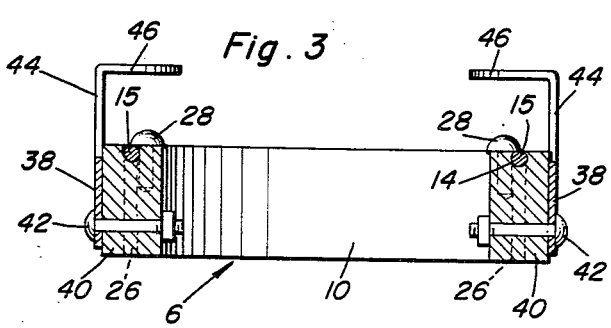
Francis A. Smalley
INVENTOR.

United States Patent Office 2,773,713
Patented Dec. 11, 1956

2,773,713

ANGLERS KNOT TYING VISE

Francis A. Smalley, Blackwell, Okla.

Application November 28, 1955, Serial No. 549,268

3 Claims. (Cl. 289—17)

The present invention relates to a simple, practical and handy portable implement which is expressly, although not necessarily, designed and constructed to be readily carried in and as a part of an angler's kit, an implement which may be amply and descriptively referred to as an angler's knot tying vise.

Classified somewhat more explicitly the stated vise is a holder for cooperating paralleling end portions of flexible elements, a line and leader for example, which is such that said end portions are lined up and clamped against accidental displacement making it possible to employ a simple turning key in such a manner that the stated end portions may be twisted together on opposite sides of an intervening loop whereby to permit the free terminal ends of the twisted portions to be drawn through the loop and pulled in such a way that the twisted portions are consolidated and tightened up to provide a barrel knot.

Briefly described, a preferred embodiment of the invention comprises a portable base having flat top and bottom surfaces and of general horseshoe shaped form providing spaced parallel coplanar arms. Outer end portions of the arms have their upper surfaces grooved and the grooves provide seats for reception and retention of the cooperating end portions of the leader and line or other analogous flexible elements. Spring hold-down fingers have terminal end portions clampingly seated in the grooves to attain and maintain the desired clamping action. Simple push-down levers are pivotally mounted on the base and have liftable and lowerable end portions to engage and release the hold-down fingers all in a satisfactory and effectual manner.

As is evident to persons familiar with the art of flexible element holding and tying devices, many and varied styles and forms of the same are well known. It follows that it is therefore a general object of the matter at hand to structurally, functionally and otherwise improve upon similarly constructed and performing knot tying vises and the like and, in so doing, to provide a simplified and economical adaptation in which manufacturers will find their manufacturing requirements economically met and fishermen, both amateurs and skilled, will find their needs effectually met.

Other objects, features and advantages will become more readily apparent from the following description and the accompanying sheet of illustrative drawings.

In the drawings, wherein like numerals are employed to designate like parts throughout the views:

Figure 1 is a perspective view of the improved holding and barrel knot tying vise showing the manner in which the same is constructed and used;

Figure 2 is a section, slightly decreased in size, taken on the plane of the line 2—2 of Figure 1 looking in the direction of the arrows;

Figure 3 is a cross section on the line 3—3 of Figure 2;

Figure 4 is an enlarged fragmentary section on the vertical line 4—4 of Figure 1; and Figure 5 is a perspective view of one end portion of one of the arms of the horseshoe shaped base.

Referring now to the drawings with the aid of reference numerals the numeral 6 designates the aforementioned base which is of one-piece construction, of suitable material and takes the form of a horseshoe. In the circumstances it may be described as comprising a pair of duplicate spaced parallel arms 8 coplanar and rectangular in cross section and connected at corresponding left hand ends by way of a bight portion 10. The top and bottom surfaces are preferably flat. The top surfaces inwardly of the outer ends are provided with clearance notches 12. These top surfaces are also provided with lengthwise grooves 14 in which resilient metallic rod members are seated. These rod members are referred to more specifically as hold-down fingers and the outer free end portions are denoted by the numerals 16 and they are seated in complemental extending portions 18 which are in effect continuations of the grooves 14. The same top surfaces are also provided with relatively short right angularly disposed additional grooves 20 which may be distinguished from the grooves 14 and their complemental portions 18 as keeper seats for the removably seated portions of the flexible elements which are to be tied together. One flexible element is denoted at 22 and the other one at 24 and they are arranged side-by-side or in substantial parallelism with portions nested in the seats or grooves 20. The left hand end portions of the rods are bent at right angles as at 26 where they are anchored in holes provided therefor in the bight portion of the base and are held firmly in place by screws or equivalent fasteners 28. It has already been revealed that these rod members are of springy steel or the like so that the terminal end portions 16 bridging the grooves 20 and seated in the grooves 18 constitute hold-down fingers. That is to say they function as retainers for maintenance of the cooperating portions of the flexible elements 22 and 24 in an obvious manner. The portions of the flexible elements between the arms 8 are adapted to be twisted together as at 30 and 32 to provide an intervening loop 34 and this is done through the use of a paddle-like twisting and turning key 36.

Each arm is provided with a release lever comprising a flat strap element 38. These levers are arranged against the flat sides 40 of the arms and hinged between their ends by simple bolts 42. What may be described as the rear end portion of the lever is directed upwardly at 44 and is fashioned into a segmental finger piece 46. The opposite end portions have turned in earlike lugs 48 which are normally seated in the clearance notches 12. These levers are manually trippable in an obvious manner for purposes of raising and clearing the hold-down fingers 16 from their cooperating grooves as brought out in phantom lines in Figure 2.

It will be obvious that this holder and knot tier permits a fisherman to tie two variations of barrel knots. This type of knot ties the leader to the line or it can be used to splice a broken line. In fact this style of a knot weakens less than any type generally known and is without reason highly recommended for use by anglers. By using the device one person can tie the knot. Without it the knot would require the hands of two persons. In fact this device is sometimes referred to loosely, of course, as a mechanical "third" hand. It will be further noted that the tempered steel spring rods 15 lie in their respective channels or grooves 14 with the free ends bridging the notches 12 and grooves 20 to function as the hold-fingers. Obviously by pressing down on either of the wing-like finger pieces 46 the levers 38 are tripped or swung on their pivots 42 and the release lugs 48 engage beneath the hold-down fingers 16 and lift the same up as shown in phantom lines in Figure 2. Although it is not necessary the block or base 6 is preferably constructed of zinc and is approximately one-half inch thick and one and one-half inches wide and about two inches long. In using the device the paddle shaped key 36 is placed between the intermediate portions of the parallel clampingly held flexible elements 22 and 24. Then it is turned to impart several more or less twists to the elements to wind the same together as at 30 and 32. Then the terminal ends 50 and 52 are threaded through the loop 34 in the manner shown. By releasing the levers and removing the twisted portions of the leader and line from their keeper seats and pulling on the terminal end portions 50 and 52 the barrel knot is completed. The terminals may be cut off if desired.

It will be obvious too that the device may be used as a clamping holder for a fish hook A as shown in Figure 5 with the barbed bill clamped in the groove 20 and held by the hold-down finger all as shown to facilitate hitching or tying the leader B to the eye C of the hook. It will be understood, however, that it is not the method steps involved because barrel knots are tied with the aid of varying types of holders and tiers. Therefore the concept is directed primarily to the mechanical manually usable and releasable vise.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in holding portions of flexible elements, for example a fishing line and leader, and uniting the same by twisting and connecting the same by way of a barrel knot, a portable vise comprising a substantially horseshoe shaped body constituting a base and embodying spaced parallel coplanar arms and a connecting bight portion, the top surfaces of the outer ends of the arms having cooperating grooves therein, spring hold-down fingers mounted atop said arms and having free end portions cooperating with the grooves, said arms also having clearance notches inwardly of the grooves, and levers pivoted on the respective vertical sides of the arms and having finger pieces at their rearward ends and lifting lugs at their forward ends seated in said notches and cooperable with said fingers.

2. For use in holding end portions of flexible elements and to assist one in uniting the same by way of a barrel knot, a portable vise comprising a base having aligned and spaced grooves for retentively seating side-by-side portions of said flexible elements, hold-down fingers mounted on said base and having resilient liftable and lowerable free terminal portions bridging and latched in place in their respective grooves, and lever means also operatively mounted on said base and adapted to lift and release said fingers and characterized by a pair of pivotally mounted manually trippable levers having end portions which engage said free terminal portions in a manner to lift the same up and free above said grooves.

3. For use in holding portions of flexible elements so that they may be twisted and united by way of a barrel knot, a portable vise comprising a base having a pair of aligned spaced grooves to accommodatingly seat and temporarily retain cooperating portions of the flexible elements in side-by-side relationship, said base also having notches therein situated inwardly of and adjacent to their respective grooves, a pair of individual hold-down fingers operatively mounted on said base and having resilient liftable and lowerable free end portions bridging the notches and resiliently retained in place and bridging the notches and also said grooves, and levers pivoted intermediate their ends on portions of said base and provided at their outer ends with laterally directed lifting lugs, said lugs being seated in said notches so that when the levers are manually depressed said lugs may be lifted upwardly in the notches to engage beneath the free end portions of the fingers, whereupon said free end portions are in positions spaced above the grooves to facilitate placing the flexible elements in the grooves and subsequently removing the twisted elements from the grooves.

References Cited in the file of this patent

UNITED STATES PATENTS

| | | |
|---|---|---|
| 2,488,414 | King | Nov. 15, 1949 |
| 2,716,036 | Fenell | Aug. 23, 1955 |
| 2,726,468 | Fahy | Dec. 13, 1955 |